Sept. 15, 1931.    J. S. McNEIL    1,823,209
AUTOMOBILE TRAVELING ROAD MAP DEVICE
Filed Aug. 10, 1929    4 Sheets-Sheet 1

INVENTOR.
James S McNeil
BY
Myron J Dikeman
ATTORNEY

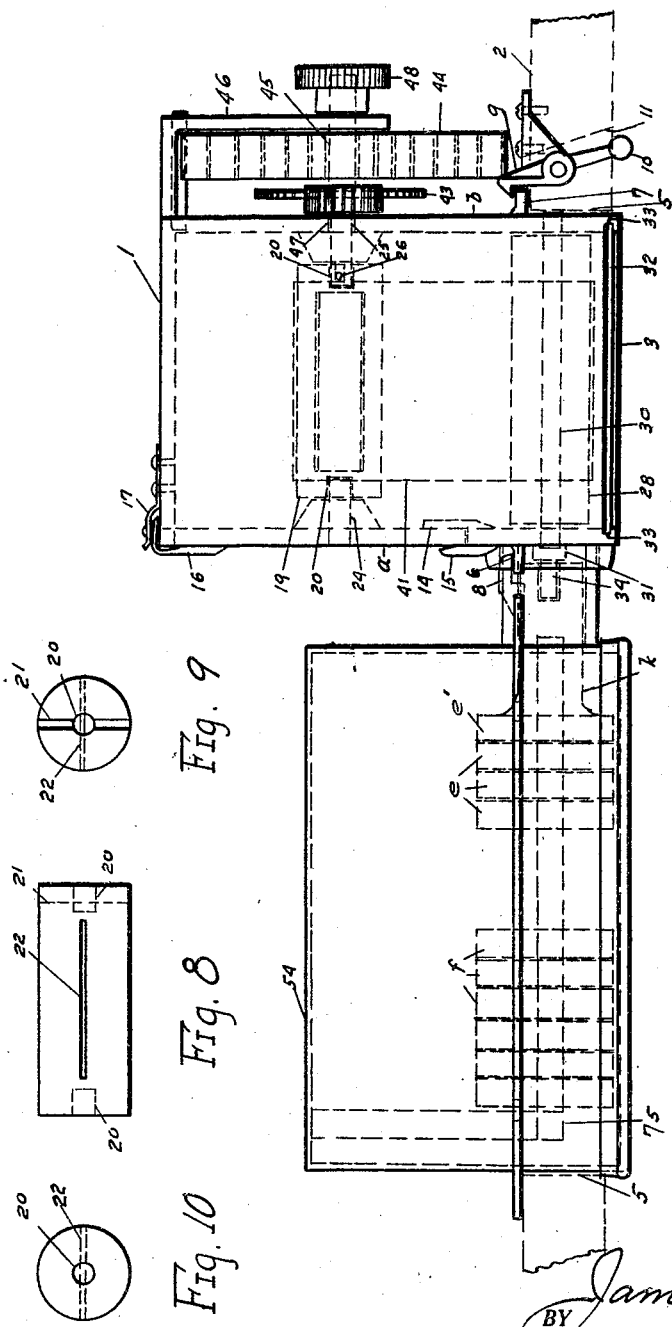

Sept. 15, 1931.    J. S. McNEIL    1,823,209
AUTOMOBILE TRAVELING ROAD MAP DEVICE
Filed Aug. 10, 1929    4 Sheets-Sheet 3

INVENTOR.
James S McNeil
BY
Myron J Dikeman
ATTORNEY.

Sept. 15, 1931.    J. S. McNEIL    1,823,209
AUTOMOBILE TRAVELING ROAD MAP DEVICE
Filed Aug. 10, 1929    4 Sheets-Sheet 4
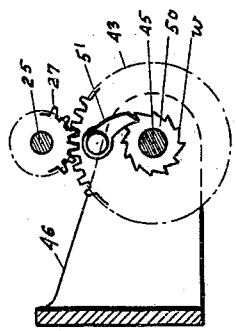
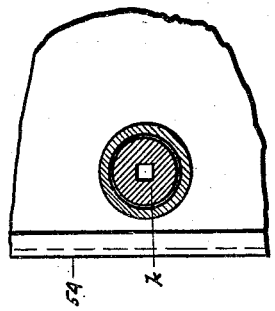
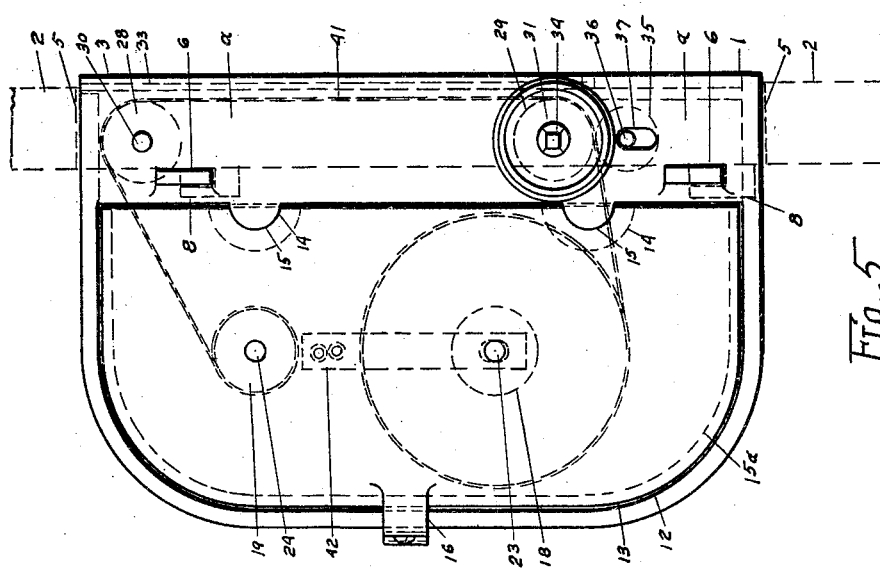
INVENTOR.
James S. McNeil
BY
Myron J. Dikeman
ATTORNEY.

Patented Sept. 15, 1931

1,823,209

UNITED STATES PATENT OFFICE

JAMES S. McNEIL, OF DETROIT, MICHIGAN

AUTOMOBILE TRAVELING ROAD MAP DEVICE

Application filed August 10, 1929. Serial No. 385,025.

The object of my invention is to produce an automatic road map device for tourists use, that will operate directly with a traveling automobile to which it may be attached, for indicating and directing the way from one locality to another along a given route, and that is adapted for night as well as day use.

Another object is to produce a mechanical road map for mounting on the instrument board of an automobile, visible to the driver at all times, adjusting the map automatically as the car is traveling along the route, so as to keep the advanced information concerning the route to be traveled constantly before the driver.

A further object is to produce a mechanical road map device that is adapted for interchanging road map tapes for various routes as desired, and that can be easily and quickly attached or detached for that purpose.

A still further object is to produce a mechanical road map device that can be mounted on the side of any standard automobile odometer, and operate therewith, for continuously changing the road map mounted therein in direct ratio to the automobile surface travel.

These several objects are attained in the preferred form by the construction and arrangement of parts more fully hereinafter set forth.

Similar parts on all drawings are marked by similar numerals and letters.

Fig. 2 is a top view of the device and connected odometer showing the relative position of the map tape rolls and operating mechanism.

Fig. 5 is also a side view of the casing taken on the line 5—5 of the Fig. 1 showing the removable wall section for interchanging the map rolls.

Fig. 6 is a sectional view taken on the line 6—6 of Fig. 1 showing the inner gear ratchets of the spring winding mechanism.

Fig. 7 is a sectional view taken on the line 7—7 of Fig. 1 showing the special connection on the side of the automobile odometer for attaching the map device thereto.

Fig. 8 is a side view of one of the map tape rolls showing the pivoted end and tape attaching slot.

Fig. 9 is an end view of the map tape roll showing the end pin slot for engaging the spring winding shaft.

Fig. 10 is also an end view of one of the map tape rolls showing the end pivot recess and position of the paper map tape slot.

Figure 1:
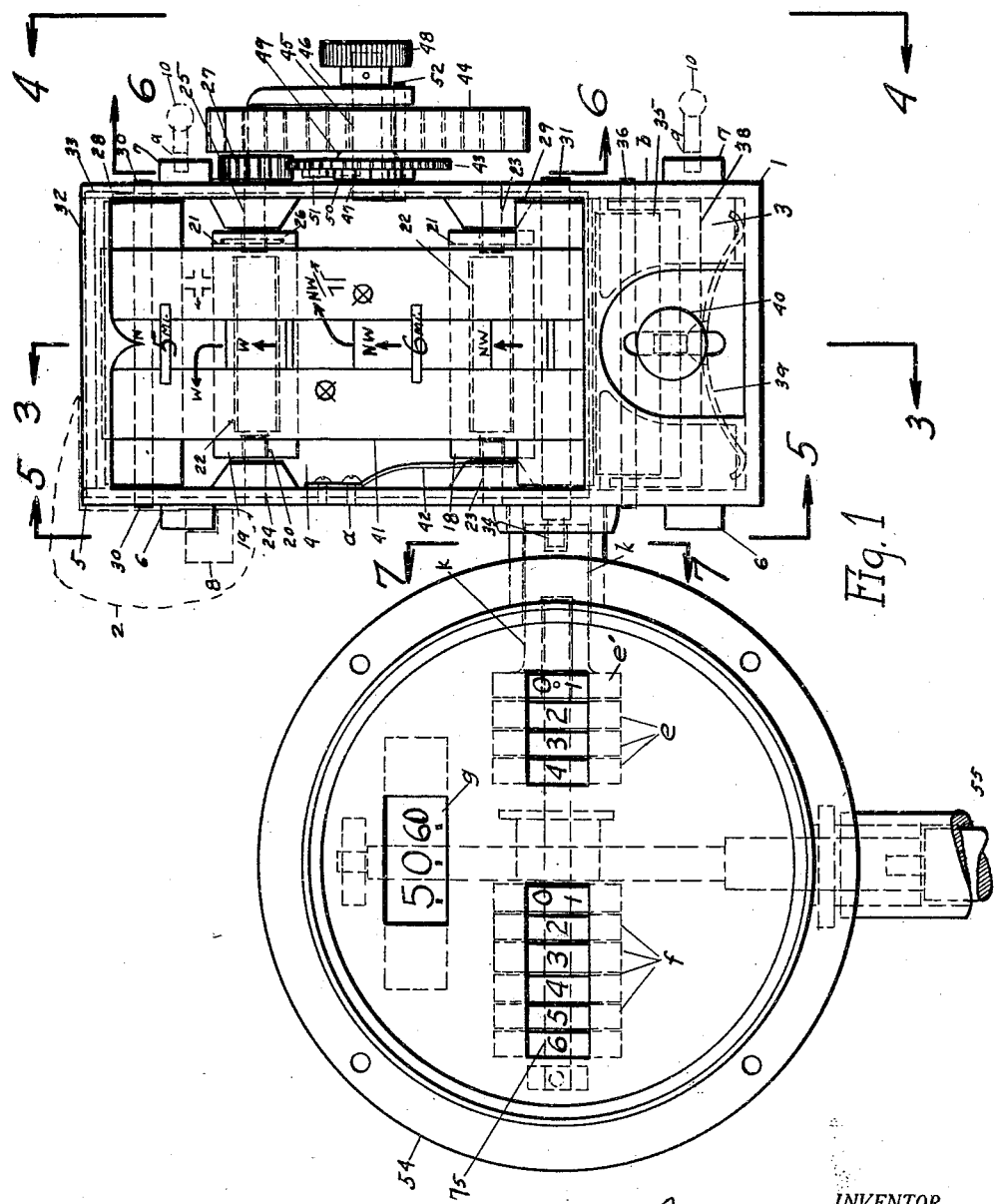
Fig. 1 is a front view of my device showing the relative position of the mounted device when connected with an automobile odometer, and the visible map section.
Figure 4:
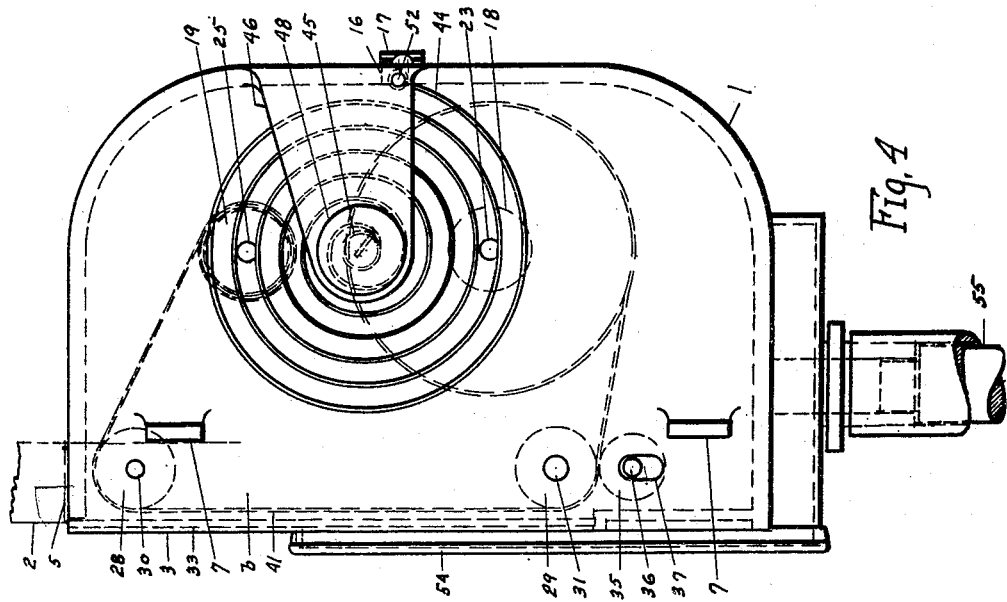
Fig. 4 is a side view taken on the line 4—4 of Fig. 1 showing the map winding mechanism.

I will now describe more fully the detail construction of my device, referring to the drawings and the marks thereon.

In general my device comprises a small metal casing suitable for mounting on the instrument board of an automobile and carries mounted therein a road map tape wound on suitable rollers controlled by suitable mechanism connected directly with the automobile odometer, and in a manner for moving the map tape in direct ratio with the automobile travel for keeping a map and driving information of the immediate road section always visible before the driver.

Figure 3:
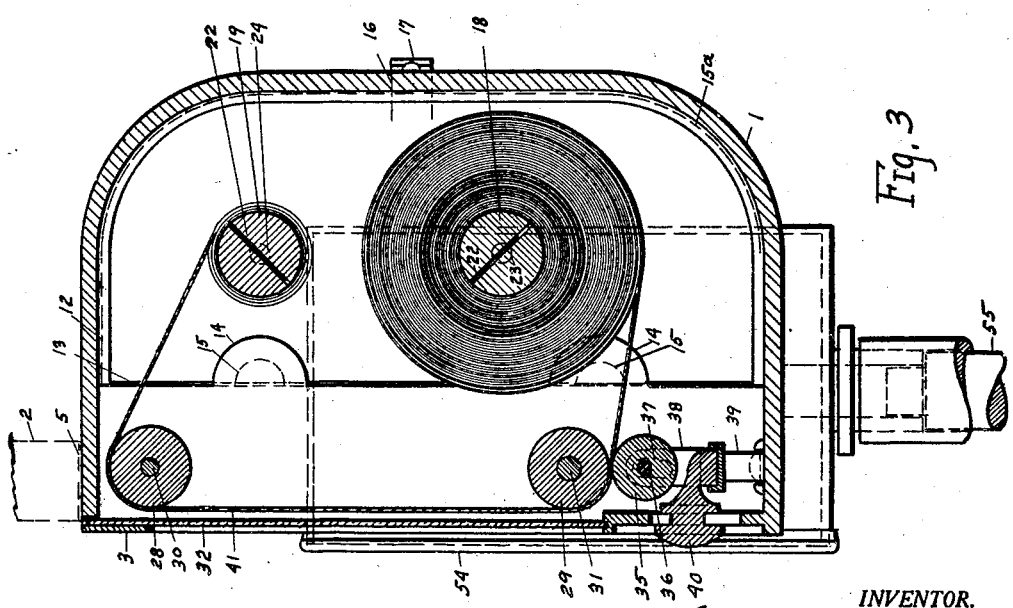
Fig. 3 is a sectional view taken on the line 3—3 of the Fig. 1 showing the position and general arrangement of the map rolls and visible map section.

The casing —1— is formed of a box shaped inclosure suitable for mounting on an instrument board —2— of an automobile. The casing —1— is made of metal, either cast metal or formed of sheet metal, and is provided with one flat face wall —3— formed with a window opening —4— therethrough, suitable for mounting in the instrument board opening —5—, positioned flush with the front face of the board. Small lugs —6— and —7— are formed along the side walls —a— and —b— of the casing —1— for detachably mounting the casing to the automobile instrument board, the lugs —6— on side —a— engage with the fixed clips —8— rigidly mounted on the back of said board, while the lugs —7— on side —b— engage the spring clips —9— pivotally mounted on the back side of the instrument board —2—, said clip —9— being provided with a small release tip —10— projected through the board opening —11—. The casing —1— being easily detached therefrom by releasing the spring clips —9—. A wall opening —12— is formed through the side —a— of the casing —1—, extending over nearly the entire side casing wall. A wall panel —13— is fitted within the wall opening —12— and mounted therein by the double clip lugs —14— and —15— and rib —15ª—, said panel being securely attached and secured therein by the clip —16— formed on the panel edge and the spring clip —17— attached to the back casing wall. A window sheet —32— of transparent material is slidably mounted within the casing opening —4— by the side wall grooves —33—, completely closing the casing. Mounted within the casing —1— are two map tape spool rollers —18— and —19—. Said rollers being formed cylindrical and provided with pivot recesses —20— in each end thereof, positioned on the centerline of the roller. At one end of the rollers —18— and —19— is formed an end driving slot —21—, positioned diametrically across the end. While the slot is used in roller —19— only, it is desirable to have the rollers interchangeable. Through the body of each roller —18— and —19— is formed a narrow tape slot —22— extending lengthwise of the roller, for engaging the end of the map tape therein when rolling said map tape thereon. The spool roller —18— is rotatably mounted within the casing —1— by the pivot pins —23— fixedly mounted in the side casing wall —b— and the wall panel —13—, said pivots being positioned to engage the pivot recesses —20— in the roller ends, retaining said roller parallel to the transparent window sheet —32—, free to turn on the pivots. The spool roller —19— is mounted at one end on a fixed pivot —24— projected from the wall panel —13—, and the other end is mounted on the winding shaft —25—, said shaft —25— being rotatably mounted in the casing side wall —b—. The roller —19— is retained within said casing —1— in a position parallel to the transparent window sheet —32— and roller —18—. The winding shaft —25— is connected to the roller —19— by a key pin —26— mounted within the shaft end positioned to engage the roll end slot —21—. A pinion gear —27— is fixedly attached to the outer end of shaft —25—, outside of the casing wall —b—. Also mounted within the casing —1— are two map tape window rolls —28— and —29—. The idler roll —28— is extended the full width of the window opening —4—, and is provided with a pivot shaft —30— for rotatably mounting the roller through the side walls —a— and —b—, positioned at the top of the casing window opening —4— and parallel to rollers —18— and —19—, said roller —28— being free to turn on its supporting pivot shaft. The feed roller —29— also extends the full width of the window opening —4—, and is fixedly mounted on a drive shaft —31—, the shaft —31— being rotatably mounted through the casing side walls —a— and —b—, positioned at the bottom of the casing window opening —4— and parallel to the rollers —18— and —19—. The diameter of the roller —29— is determined so the roller circumference will equal a scale mile of the map tape to be used thereon, and the diameter may vary as the map scale is varied. The rolls —28— and —29— are positioned in vertical alignment, parallel with the transparent window sheet —32—. The feed roller shaft —31— is projected outside the casing wall —a—, and is formed with a squared end drive plug —34—. Directly beneath the feed roller —29— is mounted a small tension roller —35—, provided with a pivot shaft —36— extending through the roller body and having the shaft ends projecting through wall slots —37— formed in the casing side walls —a— and —b—. A tension frame —38— is rotatably mounted on the shaft ends beneath the roller —35— and is provided with a suitable tension spring —39— fixedly attached thereto. The spring —39— being positioned to engage the bottom casing wall and exerts a pressure on the tension roller —35—, forcing same against the feed roller —29—. The surfaces of the rollers —29— and —35— are preferably made of rubber for engaging and restraining the paper map tape feed therethrough. A release button —40— is slidably mounted in a slotted recess in the casing face —3—, and fixedly attached to the tension frame —38— for releasing the tension roller —35— from the feed roller —29— for inserting or removing the map tape therein. A suitable map tape —41— formed with pointed ends may be threaded through the roller slot —22— of the map tape spool —18—, and said map tape wound thereon as indicated in Fig. 3 of the drawings, the road map information being positioned on the outside of the roll, and the map tape —41— threaded between the feed roller —29— and tension roller —35—, over the top of the idler window roller —28—, and the opposite end of the map tape threaded through the slot —22— of the roller —19—, and with a slight winding of the roller —19— the map tape is securely attached thereto. A tension spring —42— is fixedly attached on the casing wall panel —13—, positioned to engage the end of the roller —18— for preventing free turning thereof on its supporting pivots, except as the map tape —41— is drawn therefrom by the feed roller —29— and tension roll —35—. A winding gear —43— and a winding spring —44— are mounted on a shaft —45—, said shaft being rotatably mounted on the casing side wall —b— by the bearings —46— and —47—. The shaft —45— being provided with a turning knob —48— on the outer end thereof. The winding gear —43— is rotatably mounted on the shaft —45—, loosely between the shaft collars —49— and —50— which are fixedly attached to the shaft body. The gear —43— being connected thereto by a pawl —51— attached to the gear side by a pivot pin, said pawl engaging the teeth —w— formed on the edge of collar —50—, fixedly attaching said gear to the shaft —45— for rotation in one direction, but free therefrom when said shaft is rotated in the opposite direction. Said shaft —45— and gear —43— being positioned so the gear will engage and mesh with the pinion gear —27— connected with the map tape roller —19—. The winding spring —44— has its inner end fixedly attached to the shaft —45—, and its outer end fixedly attached to a wall post —52— mounted between the casing —1— and bearing —46—. Said winding spring and gears being capable of winding the map tape —41— on the roller —19— as the tape is drawn through the feed roller —29— and tension roller —35—, said feed roller always being rotated by some mechanical connection with the automobile speedometer. The odometer —54— illustrates any standard type, many types of which are on the market, all of which comprise a trip mileage disc units —e— and —e'—, and total mileage discs —f— and a speed recording disc —g—. The mileage discs being rotatably mounted on a shaft —75—, and connected together mechanically to record the actual mileage traveled by the automobile. The last disc —e'— of the trip mileage unit, being always the fractional mile disc, in all cases is geared to make one revolution only for each mile traveled and recorded, and this disc alone affords operative means for connecting my map section thereto. The mileage disc —e'— being provided with an extended collar —k— is attached to the squared end —34— of the feed roller shaft —31—, and thereby rotating the feed roller —29— one revolution for each mile recorded on the connected speedometer —54—. The circumference of the roller —29— always being equal to a mile scale on the map tape, thereby synchronizing the map movement with the automobile travel.

The map tape used with this device is fully described in another patent application filed Aug. 10, 1929, Serial No. 385,024, although any suitable tape made to the proper scale may be used therewith, and it is intended the map tape —41— to contain all important road information useful to an automobile driver, or tourist, traveling unknown routes between known destinations, such as all cross roads, road turns, detours, gas stations, cities or towns, or land marks along the route, all located and positioned on the map tape in exact scale at which said map is made, and in their relative positions thereon, so that as the automobile travels along the route, the map tape and information will travel in exactly the same ratio, and keep the road information for the existing and advance road sections always visible before the driver.

By releasing the attaching clip —9— mounted on the automobile instrument board —2—, the entire casing —1— may be easily and quickly detached from the instrument board and connected odometer, and by releasing the wall spring —16—, the panel —13— may then be removed from the casing —1— and the map tape rollers —18— and —19— removed therefrom, or interchanged for a different route map tape, and when the new tape is properly mounted through and over the respective rollers as heretofore specified, the wall panel —13— may then be attached and the casing remounted on the instrument board in the manner heretofore described. By winding the spring —44— the new map tape —41— will be readily wound on the roller —19— as the feed roller —29— draws same from the map roller —18—. All adjustments may be easily made to set the map tape to correspond with the odometer, by the release button —40— mounted on the front casing wall.

Having fully described my automobile traveling road map device, what I claim as my invention and desire to secure by Letters Patent is:

Claims:

1. A road map device adapted for an automobile tourist's road guide and used in combination with the automobile odometer, comprising a casing frame suitable for fixedly mounting same on an automobile odometer instrument board, said casing being formed with a front window opening, a series of map tape rollers rotatably mounted within said casing with some of said rollers positioned adjacent the front window opening and parallel therewith, a road map tape mounted on said rollers in a manner as to expose a section thereof, visibly, through said frame window opening and having the opposite map ends attached to the end rollers, a feed roller rotatably mounted within said casing positioned to engage the said road map tape for unwinding said tape from one roller, winding means attached to the opposite end roller for winding said map tape thereon as the feed roller is unwinding same from the other roller, said feed roller being connected directly with the automobile odometer end fractional mileage disc in a manner for unwinding said feed roller directly therewith, the road map printed on said tape being drawn to a scale to synchronize the map mileage with the automobile odometer mileage, said casing frame being positioned on the automobile instrument board to expose the said map tape, visibly, through the casing window.

2. A mechanical road map device adapted for an automobile tourist's road guide and used in combination with an automobile and automobile odometer, comprising a casing suitable for mounting on an automobile instrument board, said casing being formed with a front window opening, a series of parallel map tape rollers rotatably mounted within said casing, the center rollers being positioned adjacent the said frame window opening and parallel therewith, a road map tape mounted over the center rollers to expose a section thereof through said window opening, the tape ends being fixedly attached to the end rollers and wound on one of said end rollers, spring winding means attached to the other end roller for winding said road map tape thereon, a feed roller rotatably mounted within said casing positioned to engage the said road map tape for regulating the map tape unwinding, said feed roller being provided with means for directly attaching same to the end fractional mileage disc of an automobile odometer in a manner for causing an unwinding of said feed roller directly therewith, the road map being drawn to a chosen scale for synchronizing the road map tape mileage with the automobile odometer mileage.

3. A road map device adapted for use as an automobile tourist's road guide and used in combination with an automobile and automobile odometer, comprising a suitable casing for fixedly mounting on an automobile instrument board adjacent said automobile odometer, said frame being formed with a front window opening and provided with a transparent window panel, parallel map tape rollers rotatably mounted within said frame positioned with the two center tape rollers at opposite ends of said window opening, a road map tape mounted over the two center rollers to expose a portion of said map through the said window opening and the opposite map tape ends being fixedly attached to the end rollers, said map tape being rolled on one of said end rollers, spring winding means attached to the other end roller in a manner for winding said road map tape thereon as it is unwound from the opposite end roller, a tension roller mounted adjacent to one of the center window rollers and pressed in contact therewith by a suitable tension spring for engaging and restraining the map tape between said tension roller and center window roller, said center window roller being provided with means for directly connecting same with the fractional end mileage disc of the adjacent automobile odometer for causing said center window roller to unwind directly with the said end mileage disc the road map being drawn on said tape to a chosen scale for synchronizing the road map tape mileage with the automobile odometer mileage.

In witness whereof I sign these specifications.

JAMES S. McNEIL.